(12) United States Patent
Chang et al.

(10) Patent No.: US 7,331,020 B2
(45) Date of Patent: Feb. 12, 2008

(54) METHOD OF REPRESENTING A TREE DATABASE AND STORAGE MEDIUM FOR SAME

(75) Inventors: Charlie Chang, Taipei (TW); Chin-Chou Chang, Taipei (TW)

(73) Assignee: Ulead Systems, Inc., Taipei (TW)

( * ) Notice: Subject to any disclaimer, the term of this patent is extended or adjusted under 35 U.S.C. 154(b) by 610 days.

(21) Appl. No.: 10/684,447

(22) Filed: Oct. 15, 2003

(65) Prior Publication Data

US 2004/0135822 A1    Jul. 15, 2004

(30) Foreign Application Priority Data

Jan. 10, 2003    (TW)    ................. 92100492 A

(51) Int. Cl.
G06F 3/048    (2006.01)
(52) U.S. Cl. .............. 715/843; 715/825; 715/853; 715/841
(58) Field of Classification Search ................ 715/843, 715/825, 841, 853, 810
See application file for complete search history.

(56) References Cited

U.S. PATENT DOCUMENTS

| | | | | |
|---|---|---|---|---|
| 4,464,652 A | * | 8/1984 | Lapson et al. .............. 345/165 |
| 5,485,175 A | * | 1/1996 | Suzuki ....................... 715/841 |
| 6,011,555 A | * | 1/2000 | Eckhoff et al. ............. 715/843 |
| 6,456,304 B1 | * | 9/2002 | Angiulo et al. ............. 715/779 |

OTHER PUBLICATIONS

Ulead VideoStudio 5 Tutorial Jun. 8, 2001, Ulead Systems, Inc., retrieved from URL: http://web.archive.org/web/20010608201256/http://www.ulead.com/learning/vs/vs5_03_01.htm on Oct. 5, 2006, pp. 1-3.*

* cited by examiner

*Primary Examiner*—Stephen Hong
*Assistant Examiner*—Samir Termanini
(74) *Attorney, Agent, or Firm*—Birch, Stewart, Kolasch & Birch, LLP

(57)    ABSTRACT

A method of representing a tree database in a display menu. First, a tree database with a database name is provided. The provided tree database possess first level data nodes. The first level data nodes have a null set or second level data nodes. The first and the second data node have data node names. Next, one of the first level data nodes is selected as a working data node. The node name thereof is then titled the working menu. The second level data nodes possessed by the working data node are listed in the working menu. The non-selected first level data nodes are listed as a switching menu. Finally, the working menu, the switching menu, and the database name are combined into a display menu.

10 Claims, 3 Drawing Sheets

METHOD OF REPRESENTING A TREE DATABASE AND STORAGE MEDIUM FOR SAME

This nonprovisional application claims priority under 35 U.S.C. § 119(a) on patent application No(s). 092100492 filed in TAIWAN on Jan. 10, 2003, which is(are) herein incorporated by reference.

BACKGROUND OF THE INVENTION

1. Field of the Invention

The present invention relates to a database representation technology and in particular to a method of representing a tree database in a display menu.

2. Description of the Related Art

FIG. 1 is a diagram of a tree database. The database name 10 of a tree database is the root node of the tree structure. The tree database includes several first level data nodes, such as Audio 12, Image 14, and video 16. The first level data node Audio 12 includes second level data nodes, i.e. Audio sub-folder 1, Audio sub-folder 2, and Audio sub-folder 3, as shown in FIG. 1, 18. Similarly, the first level data node Image 14 owns second level data nodes 20, Image sub-folder 1, Image sub-folder 2, and Image sub-folder 3. The first level data node Video 16 includes Video sub-folder 1, Video sub-folder 2, and Video sub-folder 3, as shown in FIG. 1, 22. The second level data node may be a null set. As an example, if the first level data node Audio 12 has a null set as its second level data node, then 18 is empty while Audio 12 still belongs to the first level data nodes. The tree database can be a general database or a directory system.

Presently, there are two methods of representing the mentioned tree database. The first representation method utilizes combo boxes. The second representation method utilizes combo boxes and tabs. FIG. 2 is a diagram of representing a tree database as combo boxes. The first level data nodes of a tree database are represented in a combo box 26. The second level data nodes are represented in a combo box 28. The combo boxes 26 and 28 are displayed in a display device for selection, as shown in FIG. 2, 24.

As an example, one of the first level data nodes of a tree database is represented in a combo box 26, and may be Video. The second level data nodes of Video 26 are represented as a combo box 28. The combo box 28 only displays one of the second level data nodes, such as Video sub-folder 1. If a cursor is moved to the right side of the combo box 28, i.e. a pop-up menu is displayed, and the remaining the second level Video data nodes will be displayed in the display device. If a cursor is moved over the pop-up menu of the combo box 26, the remaining first level data nodes of the tree database, such as Audio and Image will be displayed in the display device. Therefore, a tree database can be represented completely by combo boxes and displayed in a display device for selection by the described method.

There are, however, some disadvantages to the described representation method. Regarding selection, a user must select a desired first level data node and the second level data nodes included in the selected first level data node sequentially. If the desired nodes are located at different locations or the tree structure of the tree database is very complex, the user has to switch between the first and second level data nodes repeatedly.

The second representation method utilizes combo boxes and tabs to represent a tree database. FIG. 3 is a diagram of a tree database represented by combo boxes and tabs. The first level data nodes of a tree database are represented in tabs 32. The second level data nodes included in a first level data node are represented in a combo box 34. The tabs 32 and the combo box 34 are displayed in a display device for selection, as shown in FIG. 3, 30.

For explanation, the first level data nodes of a tree database, such as Video, Audio, and Image, are represented in tabs. If the first level Video data node is represented in tab 32, then the second level Video data nodes are represented in the combo box 34. Here, the combo box 34 only displays one of the second level data nodes of Video. If a cursor is moved over the pop-up menu of the combo box 34, then the rest of the second level data nodes of Video will be displayed in the display device. Other tabs are utilized to represent other first level data nodes, such as Audio or Image. If a cursor is moved on another tab, such as tab 2, the corresponding first level data node will be displayed in the display device. The second level data nodes included in the selected first level data node tab 2 will be represented in a combo box as mentioned. Thus, a tree database can be represented in combo boxes and tabs completely and displayed in a display device for selection.

There are, however, still some problems with the described representation method. For example, if the number of the first level data nodes is very large, then the method must utilize numerous tabs to represent the first level data nodes. However, only a few data nodes will be selected as working nodes, making display and utilization inconvenient. Furthermore, the numerous tabs of the first level data nodes will occupy excessive memory space of the user interface.

SUMMARY OF THE INVENTION

Accordingly, an object of the invention is to provide a method of representing a tree database. The inventive method displays list menus in a display device, and responds to cursor movement to provide selection. The selected first level data nodes and the included second level data nodes are displayed in a working menu. The non-selected first level data nodes are displayed in a switching menu. Thus, users can select second level data nodes and other first level data nodes directly, reducing wasted memory space waste and resolving the problems of the present representation methods.

To achieve the foregoing and other objects, the invention discloses a method of representing a tree database in a display menu. First, a tree database with a database name is provided. The tree database possesses certain first level data nodes, each of which possesses a null set or second level data nodes. Each one of the first and the second data node has a data node name. One of the first level data nodes is then selected as a working data node. The node name of the working data node is titled in the first line of a working menu. Next, the second level data nodes possessed by the working data node are listed in the working menu, following the node name of the working data node. The non-selected first level data nodes are listed as a switching menu. Finally, the working menu, the switching menu, and the database name are combined into a display menu.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings, which are given by way of illustration only, and thus are not limitative of the present invention, and wherein.

DETAILED DESCRIPTION OF THE INVENTION

As summarized above, the present invention discloses a method of representing a tree database in a display menu. First, a tree database with a database name is provided. The tree database can be a general database or a directory system. The tree database includes certain first level data nodes, each of which possesses a null set or several second level data nodes. Each of the first and second data nodes has a data node name.

Next, one of the first level data nodes is selected as a working data node. The node name of the working data node is titled in the first line of a working menu. The second level data nodes possessed by the working data node are listed in the working menu, following the node name of the working data node. The non-selected first level data nodes are then listed as a switching menu.

Finally, the working menu, the switching menu, and the database name are combined into a display menu. The display menu can be displayed in a display device for selection. In the switching menu, if a cursor is moved to one of the first level data nodes, the second level data nodes possessed by the selected data node will be displayed in an extra menu. The extra menu can be displayed and selected in the display device.

Thus, if a user desires to select second level data nodes of one first level data node in the switching menu, the user need not switch between the first level and the second level repeatedly. The user only has to move the cursor to the corresponding location of the desired first level data node in the switching menu to select the desired second level data node from the extra menu.

If the provided tree database has a tree structure more than two levels, the inventive method is still applicable. For example, if a three-leveled tree database is provided, then the first and the second level data nodes are applied in mentioned method to obtain a first display menu. The second and the third level data nodes are then applied in the mentioned method again to obtain a second display menu. The first and the second display menus can be overlapping or displayed in parallel. Analogously, no matter how many levels a tree database has, the tree structure can be simplified into a two-level mapping relation of the first level, and the second level data nodes. Therefore, the invention can be applied to multi-level tree database.

Moreover, the invention provides a storage medium for storing a computer program, wherein the computer program, applied in a computer system, executes the method of representing the tree database in a display menu. The method comprises the mentioned steps.

Figure 1:
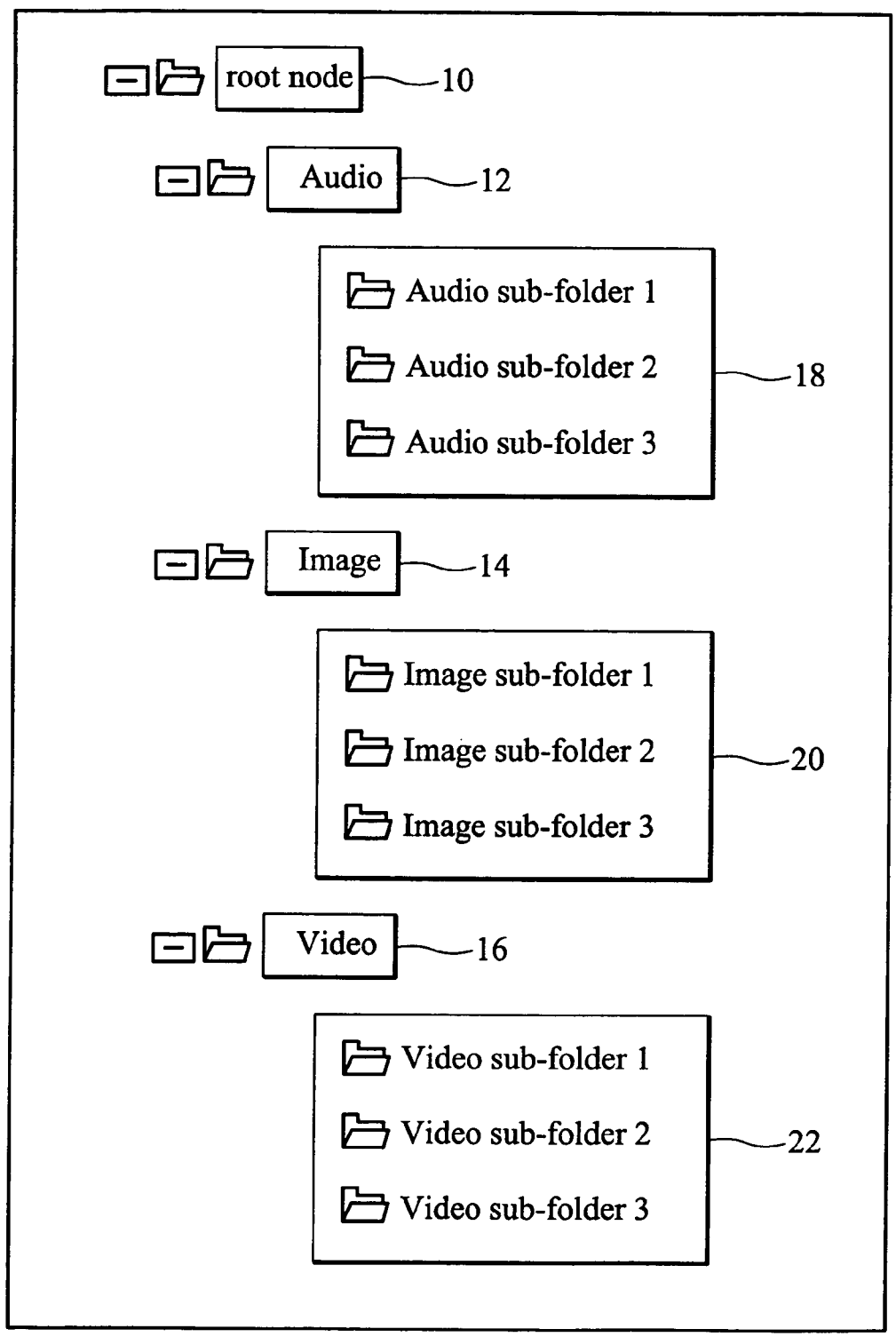
FIG. 1 is a diagram of a tree database.
Figure 2:
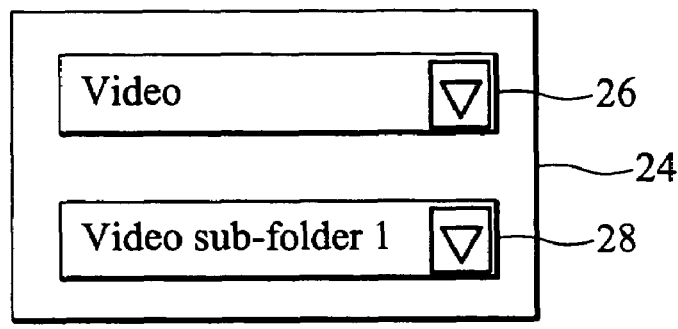
FIG. 2 is a diagram of representing a tree database in combo boxes.
Figure 3:
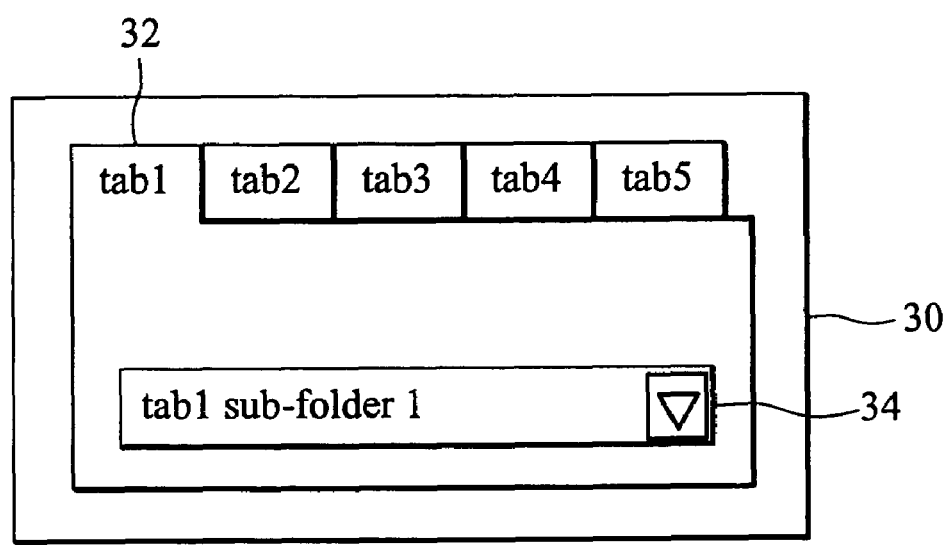
FIG. 3 is a diagram of representing a tree database in combo boxes and tabs.
Figure 4:
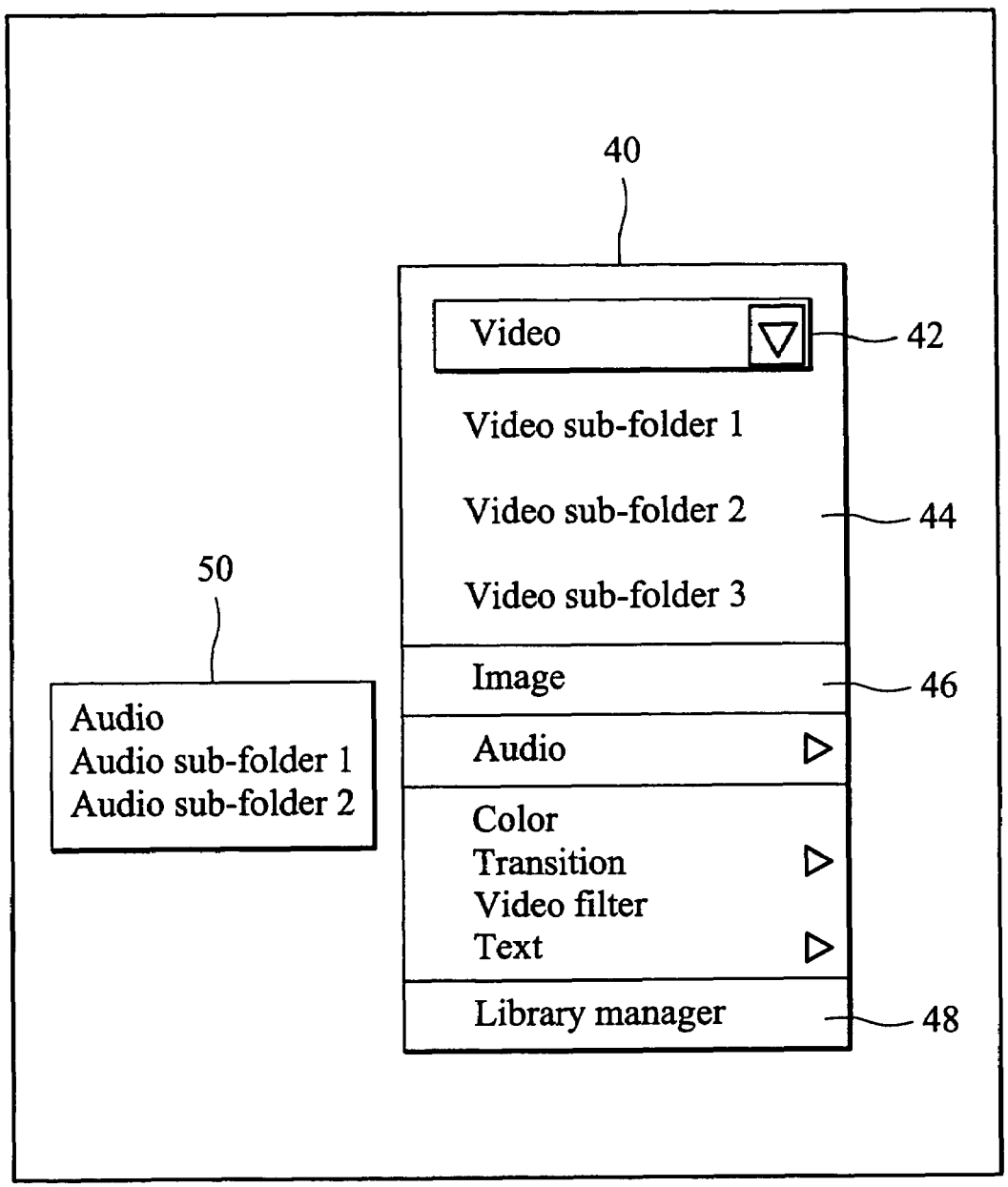
FIG. 4 is a diagram of representing a tree database in a display menu according to one embodiment.

FIG. 4 is a diagram of representing a tree database in a display menu according to one embodiment. In one embodiment, a tree database with a database name 48 (Library manager) is first provided. The tree database includes first level data nodes, such as Video, Image, Audio, Color, Transition, Video filter, and Text as shown in FIG. 4. The first level nodes, such as Image, Color, and Video filter, may possess a null set. Alternatively, the first level data nodes, such as Audio, Transition, and Text, may include second level data nodes. In implementation, a symbol or a pointer can be displayed beside the first level data nodes to identify whether the first level data node includes second level data nodes, as shown in FIG. 4, to the right side of the Audio, Transition, and Text nodes.

Next, one of the first level data nodes can be selected as a working data node 42. The node name of the working data node 42, Video, is titled in the first line of a working menu 44. The second level data nodes possessed by the working data node 42 are listed in the working menu 44, following the node name of the working data node, i.e. Video sub-folder 1, Video sub-folder 2, and Video sub-folder 3.

The non-selected first level data nodes are listed as a switching menu 46. In the switching menu 46, if the user moves a cursor to one of the first level data nodes in the switching menu, the second level data nodes possessed by the selected first level data node will be displayed in an extra menu 50. The extra menu 50 can also be displayed and selected in the display device. Selections from the extra menu 50 can be made by the cursor. Therefore, if a user desires to select a second level data node of one of the first level data nodes in the switching menu, the user need not to switch between the first and the second level repeatedly. The user only has to move the cursor to the desired first level data node in the switching menu and select directly from the extra menu 50, greatly reducing the repetition of selection between the first and the second level as required by the conventional method.

As an example, if a user desires to select Audio sub-folder 1 of Audio in the switching menu 46, the user can move the cursor of the display device to Audio in the switching menu 46. The second level data nodes included in Audio will be displayed in an extra menu 50. The user can select Audio sub-folder 1 directly from the extra menu 50.

Finally, the working menu 44, the switching menu 46, and the database name 48 are combined into a display menu 40. The display menu 40 can be displayed in a display device for user to select. If the provided tree database is a multi-level tree database, i.e. more than two levels, several display menus 40 will be produced. The produced display menus can be overlapping or displayed in parallel in the display device.

Thus, a method of representing a tree database in a display menu is provided. The inventive method utilizes list menus to represent a tree database and co-operates with the cursor of the display device for selecting, achieving the complete representation of a tree database.

It will be appreciated from the foregoing description that the method described herein provides an effective solution to the tree database representation problems. If, for example, the tree database is altered, the method of the present invention can be revised accordingly.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of representing a tree database in a display menu, comprising the steps of:
    providing a tree database with a database name, the tree database possessing a plurality of first level data nodes, each of which possesses a null set or a plurality of second level data nodes, wherein each of the first data node and the second data node has a data node name;
    selecting one of the first level data nodes as a working data node;
    titling the node name of the working data node in the first line of a working menu;
    listing the second level data nodes possessed by the working data node in the working menu, following the node name of the working data node; and
    listing the non-selected first level data nodes as a switching menu;
    wherein the working menu, the switching menu, and the database name form a display menu; and
    wherein, if a cursor is moved to select one of the first level data nodes from the switching menu, an extra menu, separate from the display menu, is generated to display the second level data nodes possessed by the selected first level data node from the switching menu.

2. The method as claimed in claim 1, wherein the display menu can be displayed and selected in a display device.

3. The method as claimed in claim 1, wherein the extra menu can be displayed and selected in a display device.

4. The method as claimed in claim 1, wherein the tree database is a general database.

5. The method as claimed in claim 1, wherein the tree database is a directory system.

6. A computer-readable storage medium for storing a computer program, wherein the computer program, applied in a computer system, executes the method of representing a tree database in a display menu, the method comprising the steps of:
    providing a tree database with a database name, the tree database possessing a plurality of first level data nodes, each of which possesses a null set or a plurality of second level data nodes, wherein each of the first data node and the second data node has data node name;
    selecting one of the first level data nodes as a working data node;
    titling the node name of the working data node in the first line of a working menu;
    listing the second level data nodes possessed by the working data node in the working menu, following the node name of the working data node;
    listing the non-selected first level data nodes as a switching menu;
    wherein the working menu, the switching menu, and the database name form a display menu; and
    wherein, if a cursor is moved to select one of the first level data nodes from the switching menu, an extra menu is generated to display the second level data nodes possessed by the selected first level data node from the switching menu.

7. The computer-readable storage medium as claimed in claim 6, wherein the display menu can be displayed and selected in a display device.

8. The computer-readable storage medium as claimed in claim 6, wherein the extra menu can be displayed and selected in a display device.

9. The computer-readable storage medium as claimed in claim 6, wherein the tree database is a general database.

10. The computer-readable storage medium as claimed in claim 6, wherein the tree database is a directory system.

* * * * *